Patented Mar. 7, 1950

2,500,126

UNITED STATES PATENT OFFICE 2,500,126

THIOKETONES

Grafton H. Keyes, Rochester, N. Y., assignor to Eastman Kodak Company, Rochester, N. Y., a corporation of New Jersey No Drawing. Original application March 4, 1943, Serial No. 478,007. Divided and this application October 3, 1945, Serial No. 620,161

4 Claims. (Cl. 260—304)

This invention relates to thioketones and to the preparation thereof. This application is a division of my copending application Serial No. 478,007, filed March 4, 1943 (now abandoned).

In my copending application Serial No. 620,162 filed of even date herewith (now United States Patent No. 2,486,173, dated October 25, 1949), I have shown that thioketones can be prepared by condensing a quaternary salt of a heterocyclic nitrogen base containing a R''—CH₂— group (wherein R'' represents hydrogen or alkyl) in the alpha or gamma positions (i. e. in one of the so-called reactive positions) with an ester of a dithiocarboxylic ester. Not only does the process give rise to thioketones (many of which were not previously available) but there are also produced simultaneously symmetrical meso-alkyl carbocyanine dyes. In some cases, the thioketone is produced in larger amounts than the meso-alkyl carbocyanine dye, while in other cases the meso-alkyl carbocyanine dye is formed almost to the exclusion of the thioketone.

This process described in my aforesaid copending applications is especially useful to produce the heretofore unavailable thioketones represented by the following general formula:

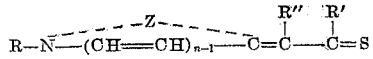

wherein R and R'' each represents an alkyl group and R' represents a member selected from the group consisting of an alkyl group, a cycloalkyl group and an aryl group, $n$ represents a positive integer of from 1 to 2, and Z represents the nonmetallic atoms necessary to complete a heterocyclic nucleus containing from 5 to 6 atoms in the heterocyclic ring, e. g. a heterocyclic nucleus of the thiazole series (e. g. 4-methylthiazole, 4-phenylthiazole, benzothiazole, 5-chlorobenzothiazole, α-naphthothiazole, β-naphtholthiazole, etc.), a heterocyclic nucleus of the selenazole series (e. g. 4-methylselenazole, 4-phenylselenazole, benzoselenazole, α-naphthoselenazole, β-naphthoselenazole, etc.), a heterocyclic nucleus of the quinoline series (e. g. 2-quinoline or 4-quinoline, etc.), a heterocyclic nucleus of the 2,3,3-trimethylindolenine series, etc.

In accordance with my invention, a quaternary salt of a heterocyclic nitrogen base containing an R''—CH₂— group (wherein R'' represents an alkyl group) in the α- or γ-position (i. e. one of the so-called reactive positions) is condensed with an ester of a dithiocarboxylic acid. Advantageously, the condensation is effected in the presence of a basic condensing agent. As basic condensing agents, organic tertiary amines are advantageously employed, e. g. trialkylamines, pyridine, N-methylpiperidine, dimethylaniline, etc. As esters of dithiocarboxylic acids, methyl dithioacetate, methyl dithiopropionate, butyl dithioacetate, methyl dithiocyclohexanecarboxylate and methyl dithiobenzoate are exemplary. As quaternary salts of heterocyclic nitrogen bases containing an R''—CH₂— group in a reactive position, the following are exemplary: 2-ethylbenzothiazole, 2-ethyl-β-naphthothiazole, 2-propylbenzothiazole, 2-ethylquinoline, 4-ethylquinoline, 2-ethyl-benzoselenazole, 2-ethyl-3,3 - dimethylindolenine, etc. Various alkyl quaternary salts can be employed, e. g. methiodides, ethobromides, β-ethoxyethobromides, allobromides, β-hydroxyethobromides, β-acetoxyethobromides, metho-p-toluenesulfonates, etho-p-toluenesulfonates, methomethylsulfates, ethoethylsulfates, etc. Alkiodides or alkobromides are advantageously employed where it is desired to isolate readily the carbocyanine dye which is formed, and alkoarylsulfonates or alkoalkylsulfates are advantageously employed where it is desired to isolate the thioketone readily. In the case of the thioketones with which the instant invention is concerned, the amount of meso-alkyl carbocyanine dye formed is usually quite small and the thioketone can be readily isolated by crystallization of the carbocyanine dye remaining in the mother liquors.

The following examples will serve to illustrate further the manner of obtaining my new thioketones.

*Example 1.—3-ethyl-2-[α-(thioacetyl)ethylidene]-benzothiazoline*

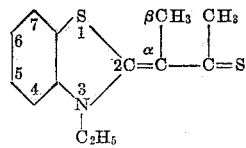

9.6 g. (1 mol.) of 2-ethylbenzothiazole eth-iodide, 3 g. (1 mol.) of methyldithioacetate, 45 cc.

of absolute ethyl alcohol and 3 g. (1 mol.) of triethylamine were heated, under reflux, for 15 minutes. The thioketone was precipitated from the reaction mixture by the addition of 1½ liters of cold water. The crude thioketone which precipitated was stirred with 50 cc. of cold ethyl alcohol. The thioketone was filtered from the ethyl alcohol and twice recrystallized from ligroin. The thioketone was obtained as red-brown needles, melting at 123° to 126° C.

*Example 2.—1-methyl-2-[α-thiopropionyl) ethylidene]-β-naphthothiazoline*

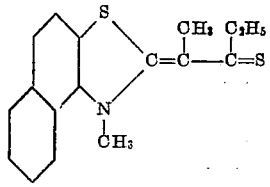

16 g. (1 mol.) of 2-ethyl-β-naphthothiazole metho-p-toluenesulfonate, 4.8 g. (1 mol.) of methyldithiopropionate, 35 cc. of absolute ethyl alcohol and 8 g. (2 mol.) of triethylamine were placed together in a 200 cc. flask and heated under reflux for 30 minutes. The reaction mixture was then poured into about 1 liter of cold water and chilled. The solid which separated was collected on filter, washed with water and methyl alcohol and dried. A portion of it was purified by recrystallization from methyl alcohol and was obtained as brownish crystals melting at 167 to 196° C. with decompoistion. The 2-ethyl-β-naphthothiazole metho-p-toluenesulfonate employed above was prepared as follows:

31.9 g. (1 mol.) of 2-ethyl-β-naphthothiazole and 27.9 g. (1 mol.) of methyl-p-toluenesulfonate were heated together in an oil bath at 125 to 130° C. for 3 hours and then on a steam bath for a further 24 hours. A solid mass of crystals was formed. It was dissolved in 60 cc. of boiling methyl alcohol. The solution was chilled and the salt was precipitated on addition of about 500 cc. of acetone and chilling. It was collected on filter, washed with acetone and dried. Yield 41.5 g. (70 per cent of theoretical). The 2-ethyl-β-naphthothiazole employed above was prepared as follows:

745 g. (1 mol.) of n-propionyl-α-naphthylamine was dissolved in 2500 cc. of dry toluene and heated to steam bath temperature. 422 g. (½ mol.) of phosphorus pentasulfide was added in small portions with mechanical stirring. Heating and stirring were continued for ten minutes after the additions of the P2S5. The hot toluene solution was decanted from a very sticky residue onto ice. 200 cc. of 40 per cent NaOH was added to the water toluene mixture which was then well stirred. Layers were separated. Thiopropionyl-α-naphthylamine was precipitated on making the aqueous layer acidic by addition of a slight excess of acetic acid, keeping the mixture cold by addition of ice. This was collected on filter and redissolved in dilute sodium hydroxide. The dilute alkaline solution was filtered. The solution was chilled by addition of ice and then the thiopropionyl-α-naphthylamine was reprecipitated on addition of acetic acid. It was collected on filter and washed with water. It was then again redissolved in dilute sodium hydroxide. To this alkaline solution, chilled by means of ice, was added excess of a water solution of potassium ferricyanide. 2-ethyl-β-naphthothiazole separated from solution and was taken up in ether. The ether solution was dried over potassium carbonate and then concentrated. The base was twice distilled. B. P. 147 to 150° C. at 2 mm. of Hg pressure.

*Example 3.—3-methyl-2[α-(thiopropionyl)-ethylidene]-benzothiazoline*

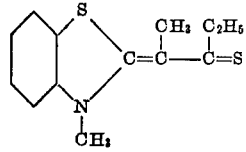

17.3 g. (1 mol.) of 2-ethylbenzothiazole metho-p-toluenesulfonate, 50 cc. of absolute ethyl alcohol, 6 g. (1 mol.) of methyldithiopropionate and 10 g. (2 mol.) of triethylamine were heated together under reflux for 30 minutes. The reaction mixture was then poured out into about 1500 cc. of cold water and the mixture allowed to stand at about 0° for two hours. The product separated as a rather sticky mass. After decantation of the liquors, the residue was stirred up with about 50 cc. of methyl alcohol and chilled. It was then collected on filter, washed with methyl alcohol and dried. The thioketone was of sufficient purity for use in making quaternary salts.

In the manner illustrated in the foregoing examples, the other thioketones of my invention can be prepared.

Any of the thioketones of my invention can be converted to alkylmercapto compounds by heating the thioketones with an alkyl salt. Alkylarylsulfonates, e. g. methyl-p-toluenesulfonate or ethyl-p-toluenesulfonate, are advantageously employed. Alkyl halides, e. g. bromides or iodides, dialkyl sulfates, etc., can be used. The following examples illustrate further the formation of alkylmercapto compounds.

*Example 4.—2-(1-methyl-2-methylmercapto-1-butenyl)-β-naphthothiazole metho-p-toluenesulfonate*

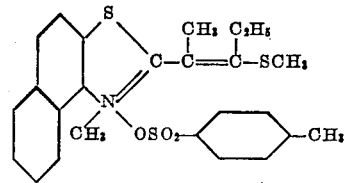

1.5 g. (1 mol.) of 1-methyl-2-[α-(thiopropionyl) ethylidene]-β-naphthothiazoline and 1 g. (1 mol.) of methyl-p-toluenesulfonate were gently heated over a free flame for about 5 minutes. A viscous mass of the above-formulated compound was formed.

*Example 5.—2-(1-methyl-2-methylmercapto-1-butenyl) benzothiazothiazole metho-p-toluenesulfonate*

1.25 g. (1 mol.) of 3-methyl-2-[α-(thiopropionyl)-ethylidene]-benzothiazoline and 1 g. (1 mol.) of methyl-p-toluenesulfonate were heated together at steam bath temperature for 30 minutes. A viscous mass of the above-named compound was formed.

In a similar manner, 2-(1-methyl-2-methylmercaptopropenyl)-benzothiazole etho-p-toluenesulfonate was prepared from 3-ethyl-2-

[α-(thioacetyl)ethylidene]-benzothiazoline and methyl-p-toluenesulfonate. In the same manner other alkyl salts, e. g. those recited above can be heated with the thioketones of my invention to give alkylmercapto compounds.

What I claim as my invention and desire to be secured by Letters Patent of the United States is:

1. A compound selected from the group consisting of the compounds which are represented by the following general formulas:

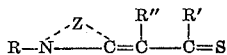

and

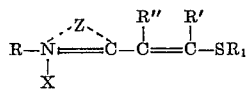

wherein R represents a member selected from the group consisting of a methyl group, an ethyl group, a β-ethoxyethyl group, an allyl group, a β-hydroxyethyl group and a β-acetoxyethyl group, R' represents a member selected from the group consisting of a methyl group, an ethyl group, a propyl group, a cyclohexyl group and a phenyl group, R" represents a member selected from the group consisting of a methyl group and an ethyl group, $R_1$ represents a member selected from the group consisting of a methyl group and an ethyl group, X represents an anion and Z represents the non-metallic atoms necessary to complete a heterocyclic nucleus of the thiazole series.

2. The thioketone of the following formula:

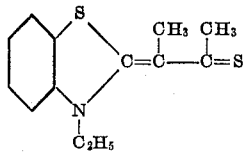

3. The thioketone which is represented by the following formula:

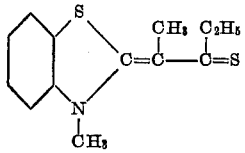

4. The thioketone of the following formula:

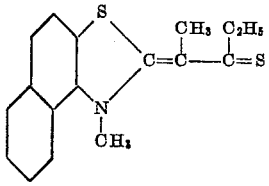

GRAFTON H. KEYES.

REFERENCES CITED

The following references are of record in the file of this patent:

FOREIGN PATENTS

| Number | Country | Date |
|---|---|---|
| 877,225 | France | Sept. 1, 1942 |